(12) United States Patent
Roque et al.

(10) Patent No.: US 9,645,814 B1
(45) Date of Patent: May 9, 2017

(54) GENERATING AND PUBLISHING APPLICATIONS FOR MULTIPLE PLATFORMS

(71) Applicant: Amazon Technologies, Inc., Seattle, WA (US)

(72) Inventors: Miguel Azancot Roque, Seattle, WA (US); Arindam Bhattacharya, Fremont, CA (US); Mihir Kumar Choudhary, San Jose, CA (US); Samuel Jared Alston, Federal Way, WA (US); Harmeet Singh Gorwara, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/702,927

(22) Filed: May 4, 2015

(51) Int. Cl.
G06F 9/44 (2006.01)
G06F 9/45 (2006.01)
G06F 9/445 (2006.01)

(52) U.S. Cl.
CPC ............... *G06F 8/71* (2013.01); *G06F 8/30* (2013.01); *G06F 8/41* (2013.01); *G06F 8/60* (2013.01)

(58) Field of Classification Search
CPC ............... G06F 8/30; G06F 8/41; G06F 8/71
USPC ............... 717/106, 120, 121, 140
See application file for complete search history.

(56) References Cited

U.S. PATENT DOCUMENTS

| 7,739,658 B2* | 6/2010 | Watson | G06F 17/30905 709/217 |
| 8,788,935 B1* | 7/2014 | Hirsch | G06F 17/2247 715/234 |
| 2013/0117733 A1 | 5/2013 | Ahmed et al. | |
| 2013/0205277 A1* | 8/2013 | Seven | G06F 8/38 717/121 |
| 2014/0025521 A1 | 1/2014 | Alsina et al. | |

(Continued)

OTHER PUBLICATIONS

Web article: "Easily create apps using the web technologies you know and love: HTML, CSS, and JavaScript" published by Adobe Systems Inc. copyright 2015 [online][retrieved on May 3, 2015] retrieved from http://www.phonegap.com, 4 pps.

(Continued)

*Primary Examiner* — Andy Ho
(74) *Attorney, Agent, or Firm* — Lee & Hayes, PLLC

(57) ABSTRACT

Technologies are disclosed for generating and publishing multi-platform application binaries from hosted websites or website source code. A developer can provide source code for a website or a link to a hosted website and identify target platforms for which application binaries should be created. The website is then modified for optimized presentation on devices on the specified target platforms. For example, page layouts, menu styles, image resolutions, and other aspects of the website can be modified for presentation on a mobile device, a tablet, a set top box, or other type of device. Source code is then generated for the target platforms that includes a web view component for rendering the website. A cross-platform compilation service then compiles the source code to generate native applications for the target platforms. The generated applications can then be provided to the developer or automatically submitted to application stores associated with the target platforms.

20 Claims, 11 Drawing Sheets

(56) References Cited

U.S. PATENT DOCUMENTS

| | | | |
|---|---|---|---|
| 2014/0047413 A1* | 2/2014 | Sheive | H04L 65/403 717/110 |
| 2014/0258969 A1* | 9/2014 | Brown | G06F 8/71 717/103 |
| 2015/0227449 A1 | 8/2015 | Kuang et al. | |
| 2016/0085516 A1 | 3/2016 | Ben-Tzur et al. | |

OTHER PUBLICATIONS

Web Article: "Meet Jenkins" published by WIKI, copyright 2004-2015 [online][retrieved on: Apr. 3, 2015] retrieved from: https://wiki.jenkins-ci.org/display/JENKINS/Meet+Jenkins, 4 pps.

Website: Mobile App Development Platform—Appcelerator, published by Appcelerator Inc.,, copyright 2008-2015 [online][retrieved on May 3, 2015] retrieved from: www.appcelerator.com, 4 pps.

Office action for U.S. Appl. No. 14/703,188, mailed on May 10, 2016, Roque et al., "Generating and Publishing Applications for Multiple Platforms", 18 pages.

Banerjee, et al., "SaaS Oriented Cieneric Cloud Compiler", http://www.sciencedirect.com/science/article/pii/S2212017313005136, 2013 Proceedings of Procedia Technology, pp. 253-pp. 261.

Broulik, "Pro jQuery Mobile", http://link.springercom/chapter/10.1007/978-Jan. 4302-3967-3_10, 2011, pp. 227-pp. 247.

Dalmasso, et al., "Survey, Comparison and Evaluation of Cross Platform Mobile Application Development Tools", <<http://ieeexplore.ieee.org/stamp/stamp.jsp?tp=&amumber=6583580&isnumber=6583517>>, 9th International Wireless Communications and Mobile Computing conference (IWCMC), 2013, pp. 323-pp. 328.

Office action for U.S. Appl. No. 14/703,188, mailed on Oct. 27, 2016, Roque et al., "Generating and Publishing Applications for Multiple Platforms ", 17 pages.

Sonawane, et al., "Cloud Compiler Based on Android", <<http://www.iisr.net/archive/v3i9/UOVOMTQ20DQ=.pdf>>, International Journal of Science and Research, vol. 3, Issue 9, Sep. 2014, pp. 2342-pp. 2346.

Woodward, "Build a mobile application I Adobe PhoneGap Build tutorials", << https://hel px.ad obe.corn/phonegap-b m"l1d/how-to1' ph on egap-bm 1c1 -first-app.html>>, Dec 10, 2013, pp. 1-pp. 186.

* cited by examiner

GENERATING AND PUBLISHING APPLICATIONS FOR MULTIPLE PLATFORMS

BACKGROUND

Application stores (which are commonly referred to as "app stores") typically provide functionality for allowing customers to browse and obtain applications for free or for a fee. For example, and without limitation, an application store might enable a customer utilizing a smartphone or tablet computing device to browse and obtain various types of applications that are suitable for use on the customer's particular type of computing device. Applications available through an application store might be provided by the operator of the application store or by third-party application developers.

Application stores currently exist for a wide variety of different computing platforms. As a result, developers commonly have to develop different versions of their applications for each of the different platforms in order to expose their applications to the greatest number of potential customers. Creating different versions of applications for different platforms can, however, be a difficult, time consuming, and expensive process. Consequently, application developers frequently only develop versions of their applications for the most popular platforms, thereby limiting the exposure of their applications to customers having devices that are compatible with those platforms.

The disclosure made herein is presented with respect to these and other considerations.

DETAILED DESCRIPTION

Figure 1A:
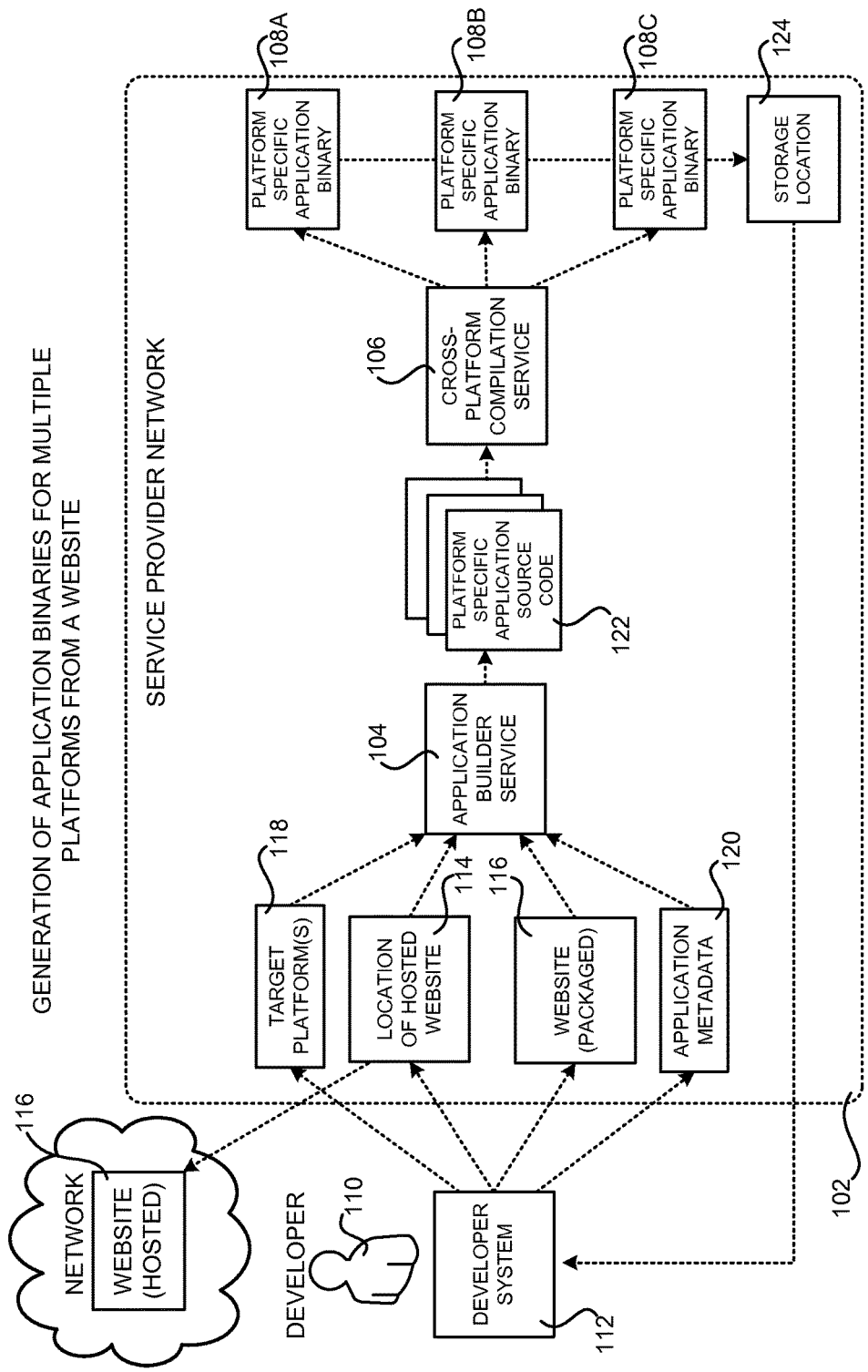
FIGS. 1A and 1B are system architecture diagrams showing aspects of the configuration and operation of several components described herein for generating and publishing application binaries for multiple platforms using a website.

The following detailed description is directed to technologies for generating and publishing applications for multiple computing platforms using a website. Utilizing an implementation of the technologies described herein, a website can be utilized to generate native applications suitable for submission to multiple application stores. For example, and without limitation, a developer can provide a website or a link to a website and identify one or more target platforms for which application binaries should be created using the website. For instance, the developer might indicate that application binaries are to be created for the APPLE iOS platform, the GOOGLE ANDROID platform, the MICROSOFT WINDOWS PHONE platform, and/or for other computing platforms.

The website identified by the developer may then be modified for optimized presentation on devices compatible with the specified target platforms. For example, page layouts, menu styles and other styles, image resolutions, and other aspects of the website can be modified for optimized presentation on a mobile device, a tablet, or a set top box on the specific platforms. Source code is then generated for the target platforms that includes a platform specific web view component configured to fetch and render the website. The source code is then compiled for the various target platforms to generate platform specific application binaries (which might be referred to herein as "application binaries", "binaries", "native applications", or simply "applications"). The website might be included in the application binaries or hosted external to the application binaries, such as at a network accessible location. The generated application binaries can then be provided to the developer or automatically submitted to application stores associated with the target platforms.

In one configuration, the source code is compiled to the platform specific application binaries by a cross-platform application compilation service. The cross-platform compilation service may execute in a service provider network or other type of distributed environment. The cross-platform compilation service can receive requests to generate platform specific application binaries for multiple computing platforms in parallel. For instance, as in the example set forth above, a developer might request generation of application binaries capable of executing on devices compatible with the APPLE iOS platform, the GOOGLE ANDROID platform, and the MICROSOFT WINDOWS PHONE platform. In response to such a request, the cross-platform compilation service may utilize a number of different virtual or physical compile systems in parallel to generate the requested binaries simultaneously.

Each of the compile systems may be configured with a development environment capable of compiling source code for a particular target platform. For example, an Apple Mac Mini operating in the service provider network might be utilized to generate application binaries that are compatible with APPLE iOS platform devices. In parallel, physical or virtual LINUX and WINDOWS computing systems might be utilized to generate the GOOGLE ANDROID and MICROSOFT WINDOWS PHONE application binaries, respectively. The generated application binaries can then be stored in a location accessible to the developer, such as within a storage service provided by the service provider network, or automatically submitted for inclusion in application stores associated with the specified target platforms.

In some configurations, the application binaries are also configured to support various cross-platform services. For example, and without limitation, the technologies disclosed herein can generate binaries that include support for an in-application purchasing service, an analytics service, an advertising service, and/or a testing service. The generated application binaries might also include software support for various platform or device specific features. For example, and without limitation, the generated binaries might provide support for specific user input devices, such as wireless remote controls or touch screens, various types of sensors, global positioning system ("GPS") hardware, and/or other types of platform specific functionality. Additional details regarding the various components and processes described briefly above for generating and publishing application binaries for multiple platforms using a website will be presented below with regard to FIGS. 1-10.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which may be referred to herein as a "FIG." or "FIGS.").

Figure 1B:
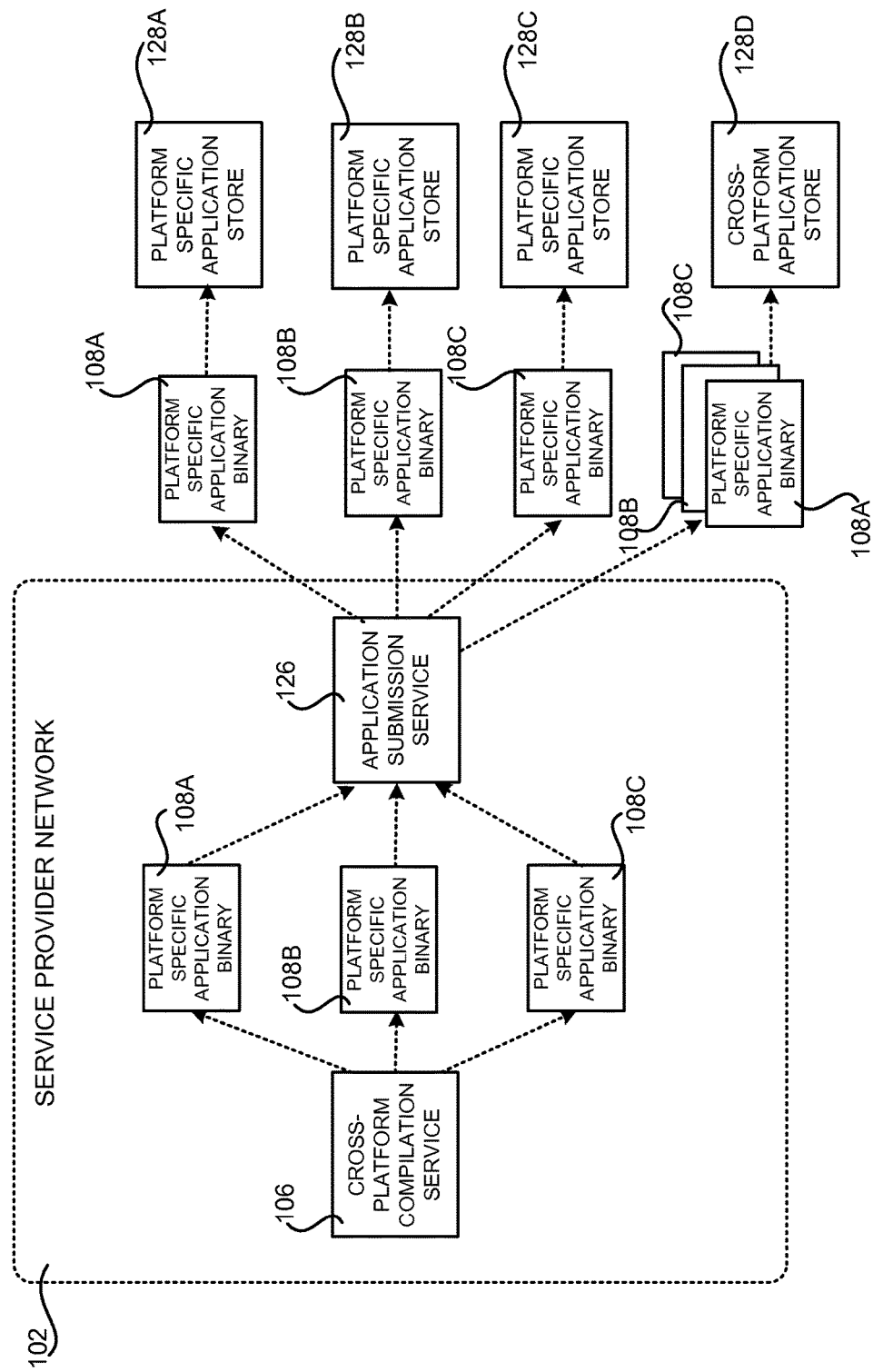

FIGS. 1A and 1B are system architecture diagrams showing aspects of the configuration and operation of several components described herein for generating and publishing application binaries for multiple computing platforms using a website. As shown in FIGS. 1A and 1B, the various configurations disclosed herein may be implemented within a service provider network 102. The service provider network 102 is a distributed network through which customers and/or other users can utilize computing resources (which may be referred to herein as "resources"), such as virtual machine instances and/or other types of computing resources and network services, on a permanent or as-needed basis. Additional details regarding one implementation of the service provider network 102 and the various types of network services that might be provided by the service provider network 102 will be discussed below with regard to FIGS. 7-10. It should be appreciated that while the implementations disclosed herein are presented primarily in the context of software components executing in a service provider network 102, the technologies disclosed herein might also be implemented in other environments.

As shown in FIG. 1A, an application builder service 104 is provided in one configuration. The application builder service 104 executes in the service provider network 102 and is configured to receive requests, such as from the developer 110, to generate platform specific application binaries 108 from a website 116. The platform specific application binaries 108 are native applications that are directly executable on devices of the target platforms. In this regard, the application builder service 104 might expose various types of interfaces through which such a request might be submitted. For example, and without limitation, a web service application programming interface ("API") might be exposed for receiving such a request from computing system (i.e. the developer system 112 in FIG. 1A) associated with the developer 110. Alternately, or in addition thereto, a web front-end might be exposed that provides a graphical user interface ("UI") through which the developer 110 can make such a request. Other types of interfaces might also be provided.

In conjunction with a request to generate platform specific application binaries 108, the developer 110 might also supply a location 114 of a hosted website 116 from which the binaries 108 are to be generated. Alternately, the developer 110 might also submit a packaged website 116. For example, a .zip file might be submitted that contains the website 116. In another configuration, the developer 110 might submit a link to the source code for a website 116 on a revision control system, such as the GITHUB revision control system. The developer 110 might identify the website 116 to be utilized to create the application binaries 108 to the application builder service 104 in other ways in other configurations.

It should be appreciated that the website 116 might include various components. For example, and without limitation, the website 116 might include markup language, such as HTML5. The website 116 might also include executable components, such as JAVASCRIPT and/or a cascading style sheet ("CSS"). The website 116 might also include and/or reference various types of content, such as text, video, audio, images, and/or other types of assets. The website 116 might also encompass other components not specifically mentioned herein.

As also shown in FIG. 1B, the developer might also identify the target platforms 118 for which application binaries 108 are to be generated using the specified website 116. For example, and without limitation, the developer 110 might indicate that application binaries 108 capable of executing on devices compatible with the APPLE iOS platform, the GOOGLE ANDROID platform, and the MICROSOFT WINDOWS PHONE platform are to be generated. The developer 110 might also indicate that application binaries 108 are to be generated for other platforms not specifically identified herein in other configurations.

The developer 110 might also specify application metadata 120 for use in generating the application binaries 108. For example, and without limitation, the developer 110 might specify a name for the application binaries 108, text descriptions for content referenced by the website 116, such as images or videos, an icon for the application binaries 108, and/or other types of metadata. As will be discussed in greater detail application metadata 120 might also be generated in some configurations from the website 116 itself. It should be appreciated that the developer 110 might also provide other types of application metadata 120 for the application binaries 108 in other configurations.

Once the application builder service 104 has received or obtained the website 116 that is to be used to generate the application binaries 108, the target platforms 118, the application metadata 120, and/or any other pertinent information, the application builder service 104 generates platform specific application source code 122 for the platform specific application binaries 108. For example, and without limitation, if the developer 110 has requested that a platform specific application binary 108A be generated that is compatible with the APPLE iOS platform, the application builder service 104 will generate platform specific application source code 122 that can be compiled on a suitable development system in order to generate an appropriate application binary 108A that can be generated on APPLE iOS devices. Similarly, if the developer 110 has requested that a platform specific application binary 108B be generated that is compatible with the GOOGLE ANDROID platform, the application builder service 104 will generate platform specific application source code 122 that can be compiled on a suitable development system in order to generate an application binary 108B that can be executed on GOOGLE ANDROID devices. Generation of the platform specific application source code 122 might also include the utilization of pre-prepared source code, templates, existing libraries, and/or other types of pre-existing components.

In order to generate the platform specific application source code 122, the application builder service 104 may first modify the website 116 for optimized presentation on computing devices configured according to the target platforms 118. For example, and without limitation, the application builder service 104 might modify page layouts and/or other types of layouts of the website 116. The application builder service 104 might also, or alternately, modify menu styles of the website 116. The application builder service 104 might also modify the resolution of images or other types of graphics referenced by the website 116 to optimize the assets for presentation on devices of the target platforms 118.

As one specific example, if the target platforms 118 include smartphone devices having smaller screens, the website 116 might be modified such that its menus, images, and/or other assets are suitable for presentation on a smaller screen. Similarly, if the target platforms 118 include a set top box that might be connected to a large display, the menus, images, and/or other assets of the website 116 might be modified in a different manner for presentation on a larger screen. In this regard, it should be appreciated that different versions of the website 116 might be created for different target platforms 118 and/or different devices within the same target platform 118 (e.g. smartphone, table, and set top boxes on the same platform).

As discussed briefly above, the application builder service 104 might also be configured to generate application metadata 120 for the application binaries 108 from the website 116 itself. For example, and without limitation, markup language (e.g. HTML5) tags and/or other types of contextual information within the website 116 might be utilized to obtain textual descriptions for graphical content, such as images or videos, referenced by the website 116. Other types of application metadata 120 might also be generated from the website 116 in a similar manner.

The application builder service 104 might also be configured to reference libraries and/or other types of code for accessing cross-platform services and platform specific functionality in the source code 122. For example, and without limitation, the source code 122 may be configured with functionality for accessing cross-platform services for providing in-application purchasing, advertising, analytics, testing, and/or other types of cross-platform services. Similarly, the source code 122 may be configured to enable utilization of platform and/or device specific functionality such as, but not limited to, wireless remote controls, touch screens, GPS devices, and/or other types of platform or device specific functionality. The particular type of functionality added to the source code 122 may depend upon the specific preference of the developer 110 and the capabilities of the particular target platforms 118 specified by the developer. For instance, and without limitation, the source code 122 might be configured to translate between the specific type of input provided by a platform-specific input device and the type of input expected by the website. Commands received via a wireless remote control, for example, might be translated to key presses expected by the website. Other types of translations might also be performed. Additional details regarding the utilization of cross-platform services and platform specific functionality will be provided below with regard to FIGS. 2A and 2B.

Once the platform specific application source code 122 has been generated, the application builder service 104 requests compilation of the source code 122 by a cross-platform compilation service 106 in one configuration. As will be discussed in detail below with regard to FIGS. 4-6, the cross-platform compilation service 106 provides functionality for compiling the platform specific application source code 122 to generate platform specific application binaries 108A-108C for the target platforms 118 specified by the developer 110.

As shown in FIG. 1A, the platform specific application binaries 108 might be stored in a storage location 124 in the service provider network 102 in one configuration. The storage location 124 may be provided by a storage service executing in the service provider network 102 in one configuration. The address of the storage location 124 may be provided to the developer 110. In this way, the developer 110 can retrieve the platform specific application binaries 108 and test the binaries 108 or manually submit the binaries 108 to application stores associated with the target platforms 118.

In some configurations, the platform specific application source code 122 is provided to the developer 110. For example, the platform specific application source code 122 can be stored in the storage location 124. The network address of the storage location 124 can then be provided to the developer 110. The developer 110 may then review and/or make modifications to the platform specific application source code 122. Subsequently, the developer might provide the modified platform specific application source code 122 to the cross-platform compilation service 106 for compilation and, potentially, submission to application stores in the manner described below.

The application binaries 108 might be automatically submitted to application stores associated with the target platforms 118 in some configurations. For example, and as shown in FIG. 1B, once the platform specific application binaries 108 have been generated, an application submission service 126 might also submit one or more of the generated binaries 108 to the application stores 128A-128C for the target platforms 118 on behalf of the developer 110. As discussed briefly above, an application store 128 is an electronic marketplace where customers can purchase application programs for download and use on their own customer devices. An application store 128 might offer applications for use on customer devices such as smart phones, tablet computers, laptop or desktop computers, game consoles, set top boxes, and/or other types of computing devices.

An application store 128 typically provides functionality for permitting customers to browse and purchase available applications. For instance, an application store 128 may receive a browse request from a customer device and, in response thereto, retrieve information regarding a particular application offered for sale from the application store 128 referenced by the browse request, generate or retrieve information describing the application, and transmit the information over a network to a client application (not shown in FIG. 1A or 1B) executing on the customer device for display to the customer. The application information may include a name of the application, the name of the application developer that developed the application, a text description of the application, one or more images of the application during execution, a price for the application, and/or other information. The application information might be stored in an suitable database or other type of data store maintained by the application store 128 for each application offered for sale. If the customer requests to purchase the application, the application may be downloaded to the customer device for execution.

The application stores 128 might also provide functionality for allowing an application developer 110 to submit an application for inclusion in the application store 128. For example, and without limitation, the application stores 128 may be configured to provide an API or other type of interface through which a developer 110 can submit an application for inclusion in the application stores 128 in some configurations. Other types of interfaces, such a web-based interface through which an application developer 110 can submit an application for inclusion in the application store 128 and define application metadata for an application, such as a description of the application, the price for the application, if any, and other information pertinent to the application, might also be provided. In some configurations, the application submission service 126 utilizes an API exposed by the application stores 128 to submit the application binaries 108 to the application stores 128. Other mechanisms might also be utilized.

In the example shown in FIG. 1B, the application stores 128 are platform specific application stores. For example, the application store 128A might be an application store operated by APPLE, INC. for providing applications compatible with the APPLE iOS platform. In this example, the platform specific application binary 108A is configured for execution on devices executing the APPLE iOS operating system. Similarly, the application store 128B might be an application store operated by GOOGLE, INC. for providing applications compatible with the GOOGLE ANDROID platform, and the platform specific application binary 108B may be compatible with the GOOGLE ANDROID operating system. Likewise, the application store 128C might be an application store provided by MICROSOFT CORP. for providing applications compatible with the MICROSOFT PHONE platform, and the platform specific application binary 108C might be configured for execution on devices executing the WINDOWS PHONE operating system. Although three platform specific application stores 128A-128C have been illustrated in FIG. 1B, a different number and type of application stores 128 might also be utilized in a similar manner.

In the example shown in FIG. 1B, the application store 128D is a cross-platform application store. A cross-platform application store 128D is able to provide applications compatible with multiple software platforms. For instance, in the example shown in FIG. 1B, all of the platform specific application binaries 108A-108C are being submitted to the cross-platform application store 128D. In this manner, applications compatible with a multitude of computing platforms can be offered and sold through a single application store 128D. In this regard, it should be appreciated that other types of application stores might be utilized in other configurations.

Although not illustrated in FIG. 1B, it should be appreciated that the application submission service 126 might also be configured to distribute the modified website 116 for consumption via the web. For example, and without limitation, the modified website 116 might be stored in an appropriate location in the service provider network 102 for access by device via the web. In this way, the website 116 can be configured for access via devices on the target platforms 118 without the need to access an application store 128. The website 116 might also be distributed in other ways in other configurations.

Figure 2B:
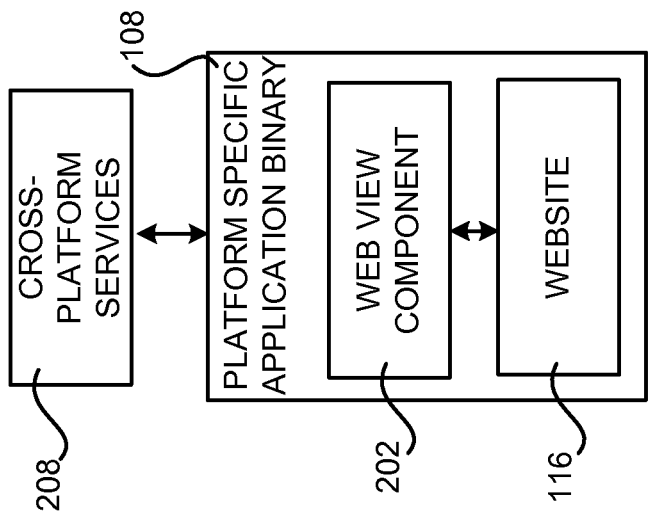
FIGS. 2A and 2B are software architecture diagrams showing aspects of the configuration and operation of platform specific application binaries generated utilizing the technologies disclosed herein.
Figure 2A:
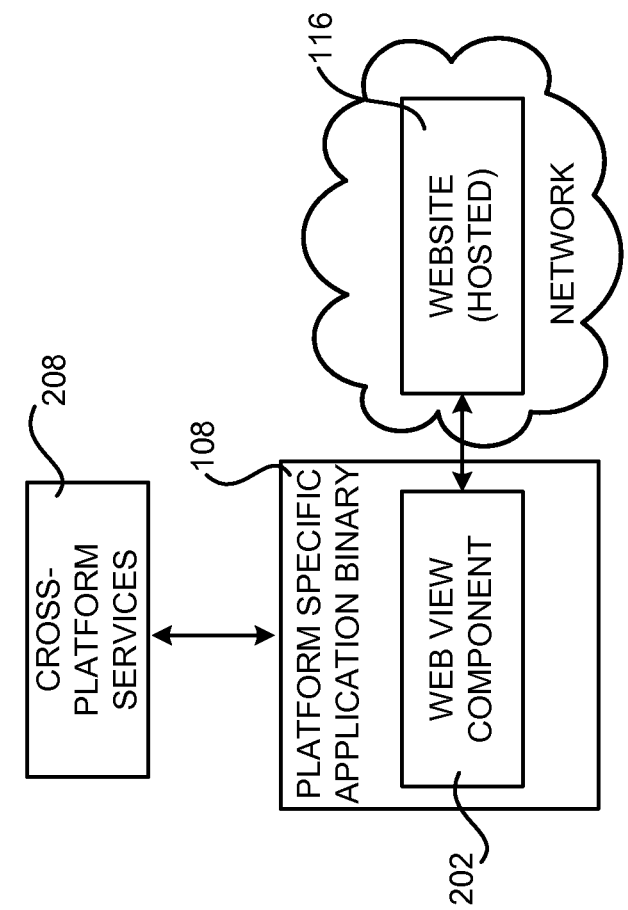

FIGS. 2A and 2B are software architecture diagrams showing additional aspects of the configuration and operation of platform specific application binaries 108 generated utilizing the technologies disclosed herein. As shown in FIG. 2A, a platform specific application binary 108 may include a web view component 202 in some configurations. The web view component 202 is a software component configured to fetch and render the website 116. For instance, in the example shown in FIG. 2A, the web view component 202 may retrieve the website 116 from a hosted network location and render the website 116.

The type of web view component 202 utilized for each platform specific binary 108 will be dependent upon the target platform 118 that the application binary 108 is created for. For instance, if the application binary 108 is created for the APPLE iOS platform, the web view component 202 will typically be a UIWebView component or a WKWebView component. If the application binary 108 is created for the GOOGLE ANDROID platform, the web view component 202 will typically be an instance of the ANDROID WebView class. Other web view components might be utilize in other configurations. For example, and without limitation, performance optimized web view components might be created for various target platforms 118 and distributed with the platform specific application binaries 108.

As illustrated in FIG. 2B, in some configurations the website 116 may be included in the platform specific application binary 108. For example, if the developer 110 desires offline access to the website 116, the website 116 may be included in the platform specific application binary 108. Similarly, it may be desirable to include the website 116 in the platform specific application binary 108 to reduce latency (i.e. the time required to fetch and render the website 116) and thereby improve performance of the platform specific application binary 108. Other configurations might also be utilized wherein a portion of the website 116 is contained in the platform specific application binary 108 and another portion of the website 116 is hosted. Other configurations might also be utilized. In this regard, because the platform specific application binaries 108 "wrap" the website 116, the application binaries 108 may be referred to herein as platform specific wrappers for a web site 116.

As discussed briefly above, the platform specific application binaries 108 can also provide support for cross-platform services 208. In particular, binaries 108 can be generated that include support for an in-application purchasing service, an analytics service, an advertising service, a testing service, and/or other types of services. Through these mechanisms, application binaries 108 executing on the target platforms 118 can utilize a common cross-platform mechanism to purchase in-application items, to obtain and present advertisements, to perform testing of the application binaries 108, and to collect analytics information regarding the execution and utilization of the application binaries 108 across the various target platforms 118. Other types of cross-platform functionality might also be enabled through an implementation of the mechanisms disclosed herein.

The generated application binaries 108 might also include software support for various platform or device specific features. For example, and without limitation, the generated binaries might provide support for specific user input devices, such as wireless remote controls or touch screens, various types of sensors, GPS hardware, and/or other types of platform specific functionality.

Figure 3:
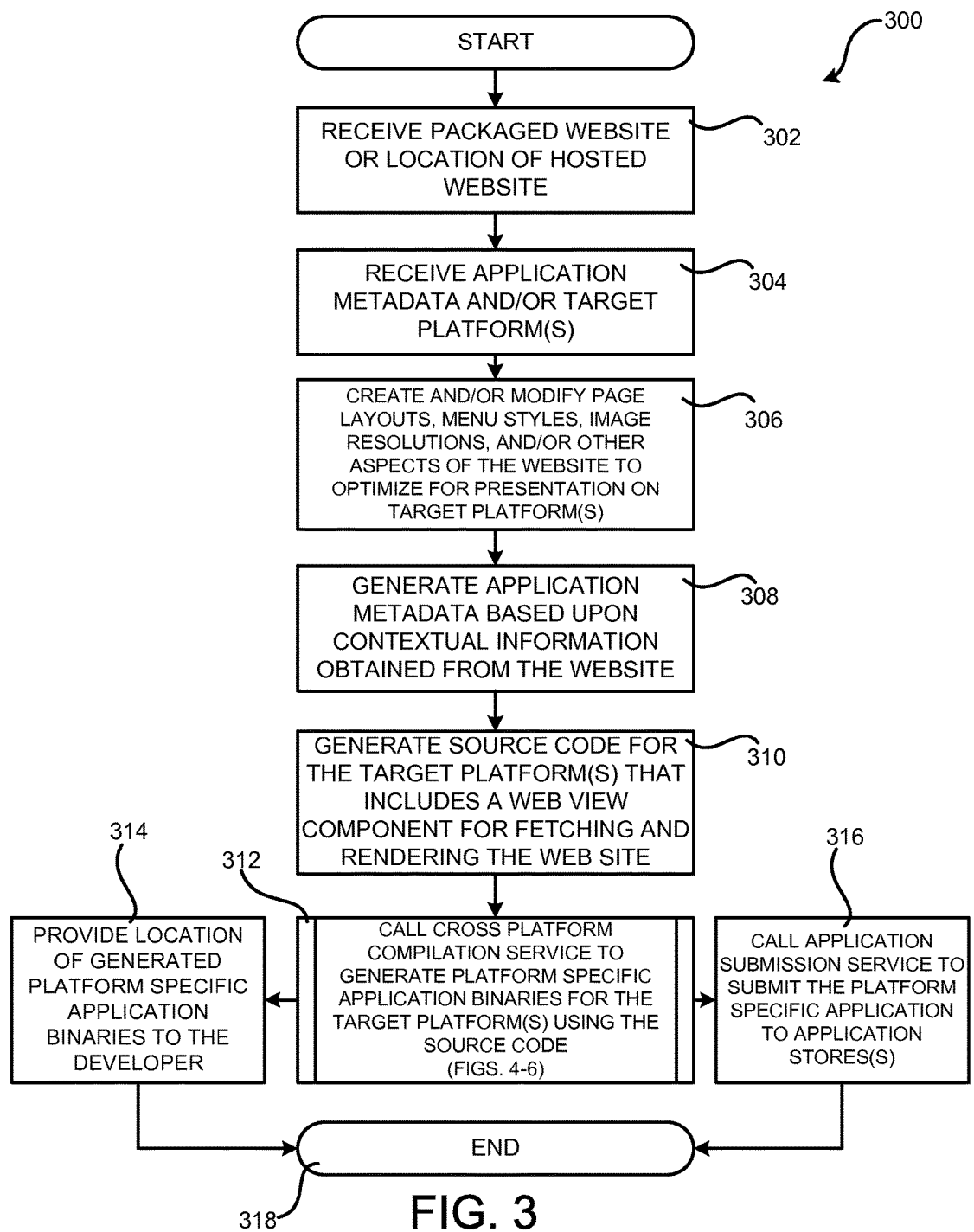
FIG. 3 is a flow diagram illustrating aspects of an illustrative routine disclosed herein for generating and publishing application binaries for multiple platforms using a website, according to one configuration disclosed herein.

FIG. 3 is a flow diagram illustrating aspects of an illustrative routine 300 disclosed herein for generating and publishing application binaries 108 for multiple platforms from a website 116, according to one configuration disclosed herein. It should be appreciated that the logical operations described herein with respect to FIG. 3, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein. Some or all of these operations might also be performed by components other than those specifically identified.

The routine 300 begins at operation 302, where the application builder service 104 receives a request to create application binaries 108 from a website 116. As discussed briefly above, such a request may specify a location 114 of a hosted website 116 from which the binaries 108 are to be generated. Alternately, the developer 110 might also submit a packaged website 116. In another configuration, the developer 110 might submit a link to the source code for a website 116 on a revision control system. The developer 110 might identify the website 116 to be utilized to create the application binaries 108 to the application builder service 104 in other ways in other configurations.

From operation 302, the routine 300 proceeds to operation 304, where the application builder service 104 receives application metadata 120 from the developer 110. For example, and without limitation, the developer 110 might specify a name for the application binaries 108, text descriptions for content referenced by the website 116, such as images or videos, an icon for the application binaries 108, and/or other types of application metadata 120.

At operation 304, the application builder service 104 might also receive an identification of the target platforms 118 for which application binaries 108 are to be generated using the specified website 116 from the developer 110. For instance, as in the example set forth above, the developer 110 might indicate that application binaries 108 capable of executing on devices compatible with the APPLE iOS platform, the GOOGLE ANDROID platform, and the MICROSOFT WINDOWS PHONE platform are to be generated. The developer 110 might also indicate that application binaries 108 are to be generated for other platforms not specifically identified herein in other configurations.

Once the application builder service 104 has received or obtained the website 116 that is to be used to generate the application binaries 108, the target platforms 118, the application metadata 120, and/or any other pertinent information, the routine 300 proceeds from operation 304 to operation 306. At operation 306, the application builder service 104 modifies the website 116 for optimized presentation on computing devices configured according to the target platforms 118. For example, and as discussed above, the application builder service 104 might modify page layouts and/or other types of layouts of the website 116, modify menu styles of the website 116, modify the resolution of images or other types of assets of the website 116 to make the assets presentable on devices of the target platforms 118, and/or make other modifications to the website 116.

From operation 306, the routine 300 proceeds to operation 308, where the application builder service 104 generates application metadata 120 for the application binaries 108 from the website 116 itself. For example, markup language (e.g. HTML5) tags and/or other types of contextual information within the website 116 might be utilized to generate textual descriptions for graphical content, such as images or videos, referenced by the website 116. Other types of application metadata 120 might also be generated from the website 116 in a similar manner.

From operation 308, the routine 300 proceeds to operation 310, where the application builder service 104 generates platform specific application source code 122 for the platform specific application binaries 108. As discussed above, the source code 122 "wraps" the website 116 by including a web view component 202 configured to fetch and render the web site 116. The source code 122 might also be configured to reference libraries and/or other types of code for accessing cross-platform services and platform specific functionality. In some examples, different versions of the source code 122 are generated based upon different themes or templates to provide different visual presentations. The application developer 110 might be permitted to choose among the different versions.

Once the platform specific application source code 122 has been generated, the routine 300 proceeds to operation 312, where the application builder service 104 calls the cross-platform compilation service 106 to compile the source code 122 into application binaries 108 for the target platforms 118. As discussed briefly above, the cross-platform compilation service 106 provides functionality for compiling the platform specific application source code 122 to generate platform specific application binaries 108 for the target platforms 118 specified by the developer 110. Additional details regarding the configuration and operation of the cross-platform compilation service 106 will be provided below with regard to FIGS. 4-6.

As discussed above, the platform specific application binaries 108 generated for the target platforms 116 are stored in a storage location 124 in the service provider network 102 in one configuration. At operation 314, the address of the storage location 124 containing the platform specific application binaries 108 is provided to the developer 110. In this way, the developer 110 can retrieve the platform specific application binaries 108 and test the binaries 108 or manually submit the binaries 108 to application stores associated with the target platforms 118.

In some configurations, the routine 300 proceeds from operation 312 to operation 316, where the application submission service 126 is called in order to automatically submit the application binaries 108 to the application stores associated with the target platforms 118. From operations 314 and 316, the routine 300 proceeds to operation 318, where it ends.

Figure 4:
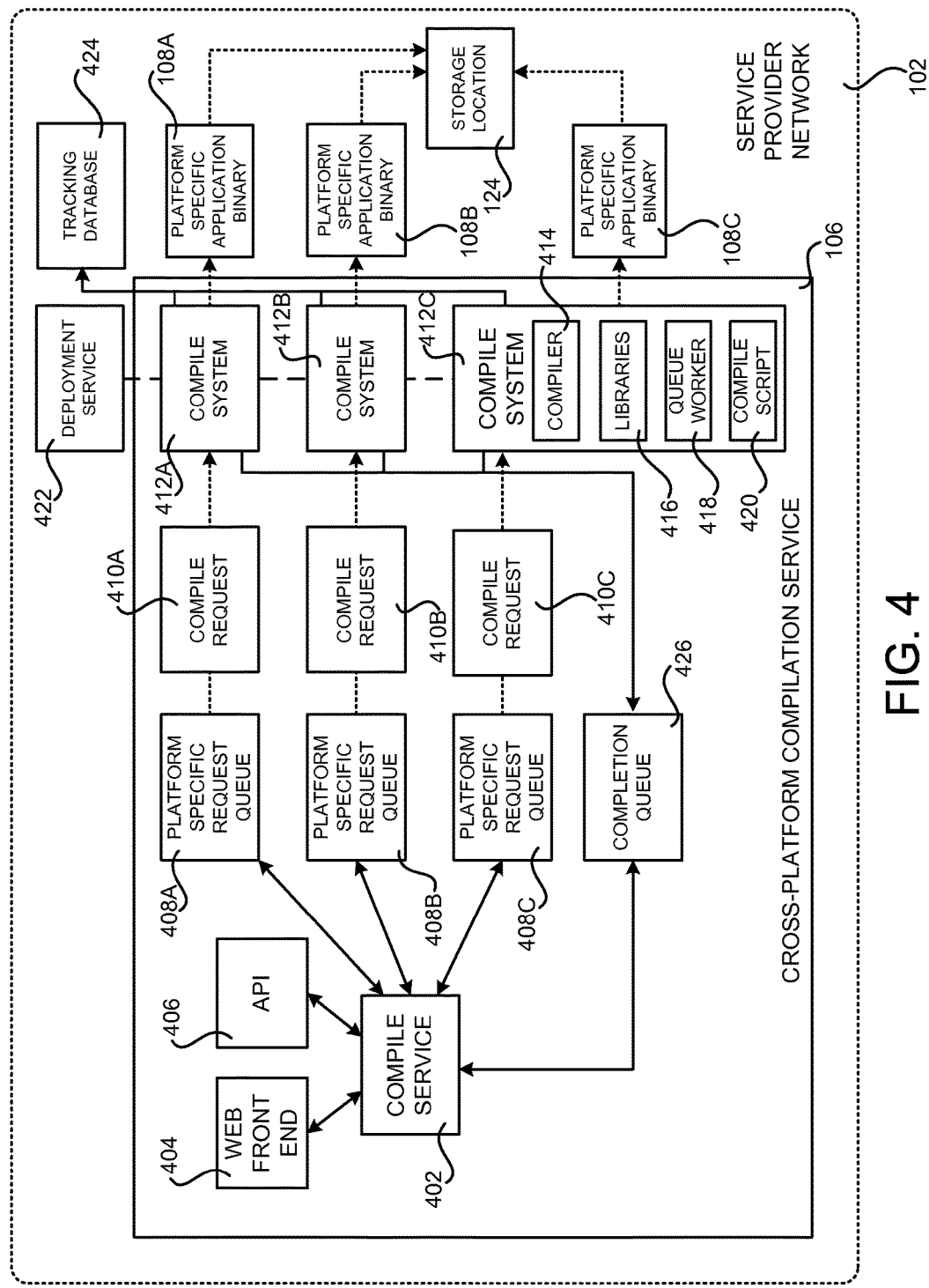
FIG. 4 is a system architecture diagram showing additional aspects regarding the configuration and operation of a cross-platform compilation service utilized in some configurations disclosed herein.

FIG. 4 is a system architecture diagram showing additional aspects regarding the configuration and operation of the cross-platform compilation service 106 utilized in some configurations disclosed herein. As shown in FIG. 4, the cross-platform compilation service 106 might include a compile service 402, a number of platform specific request queues 408A-408C, a completion queue 426, and a number of compile systems 412A-412C. As also shown in FIG. 4, the compile service 402 might expose various types of interfaces for receiving requests to compile source code 122 to platform specific application binaries 108. For example, and without limitation, the compile service might expose a web front end 404 and/or a web service API 406 for receiving such requests. Other types of interfaces might also be exposed in other configurations.

When the compile service 402 receives a request to compile source code 122 into the application binaries 108, the compile service 402 places compile requests 410 on appropriate platform specific request queues 408. For example, and without limitation, a platform specific request queue 408A may be created for storing compile requests 410 for compiling APPLE iOS application binaries 108. Similarly, another platform request queue 408B may be created for storing compile requests 410 for compiling GOOGLE ANDROID application binaries 108. Yet another platform request queue 408C might be created for storing compile requests 410 for compiling WINDOWS PHONE application binaries 108. Other platform specific request queues 408 might also be created for storing compile requests 410 for other platforms. Additionally, although only a single queue 408 per platform is illustrated in FIG. 4, more than one queue 408 might be maintained for each target platform 118. Additional details regarding the content of the compile requests 410 will be provided below with regard to FIG. 5.

As discussed briefly above, a number of compile systems 412 might also be maintained. The compile systems 412 are virtual or physical computing systems configured with software components for compiling source code 122 into application binaries 108 for a particular target platform 108. For instance, in the example given above, the compile system 412A might be configured with a development environment and/or other software components for building APPLE iOS application binaries 108, the compile system 412B might be configured with a development environment and/or other software components for building GOOGLE ANDROID application binaries 108, and the compile system 412C might be configured with a development environment and/or other software components for building WINDOWS PHONE application binaries 108. Additional compile systems 412 might also be provided and configured to build application binaries 108 for other target platforms 118.

In one configuration, a deployment service 422 executing in the service provider network 102 is utilized to configure the compile systems 412. For example, and without limitation, the deployment service 422 may be configured to deploy a suitable development environment to each of the compile systems 412 that includes a compiler 414. The deployment service 422 might also be configured to deploy libraries 416 to the compile systems 412. The libraries 416 might provide various types of functionality such as, but not limited to, enabling the utilization of cross-platform services, enabling device or platform specific functionality, and/or providing other types of functionality.

The deployment service 422 might also be configured to deploy a queue worker 418 to the compile systems 412. The queue worker 418 is a software component configured to monitor a corresponding platform specific request queue 408 for the presence of compile requests 410. For example, a queue worker 418 executing on the compile system 412A may monitor the queue 408A, a queue worker 418 executing on the compile system 412B may monitor the queue 408B, and a queue worker 418 executing on the compile system 412C may monitor the queue 408C.

If a queue worker 418 determines that a compile request 410 is present on its associated queue 408, the queue worker 418 will dequeue the compile request 410. The queue worker 418 will then extract a compile script 420 from the compile request 410 end execute the compile script 420. The compile script 420 is a script configured to cause a compile system 412 to compile the source code 122 contained in or referenced by a compile request 410.

As shown in FIG. 4, a database service in the service provider network 102 might be configured to provide a tracking database 424. The queue worker 418, compile script 420, and/or other components may be configured to write data to the tracking database 424 describing aspects of their operation. For example, and without limitation, a queue worker 418 may be configured to write data to the tracking database 424 when a compile request 410 has been dequeued from a platform specific request queue 408. As another example, the compile script 420 might be configured to write data to the tracking database 424 when compilation of source code 122 has started or ended. The compile service 402 may be configured to retrieve data from the tracking database 424 to provide status updates to a requestor regarding the status of a compile job.

Additionally, the compile script 420 or another component might also be configured to place an entry in the completion queue 426 when a compile job has completed. The compile service 402 may dequeue these entries and, in response thereto, provide a notification to a requestor indicating that application binaries 108 have been generated. As discussed above, the compile service 402 might also provide the address of the storage location 124 containing the platform specific application binaries 108. Additional details regarding the configuration and operation of the cross-platform compilation service 102 will be provided below with regard to FIGS. 5 and 6.

It should be appreciated that, as a result of the architecture shown in FIG. 4, multiple compile requests 410 may be processed in parallel by the compile systems 412. In this way, platform specific application binaries 108 for a multitude of platforms can be generated simultaneously in response to a request from a developer 110. Other configurations might also be utilized.

Figure 5:
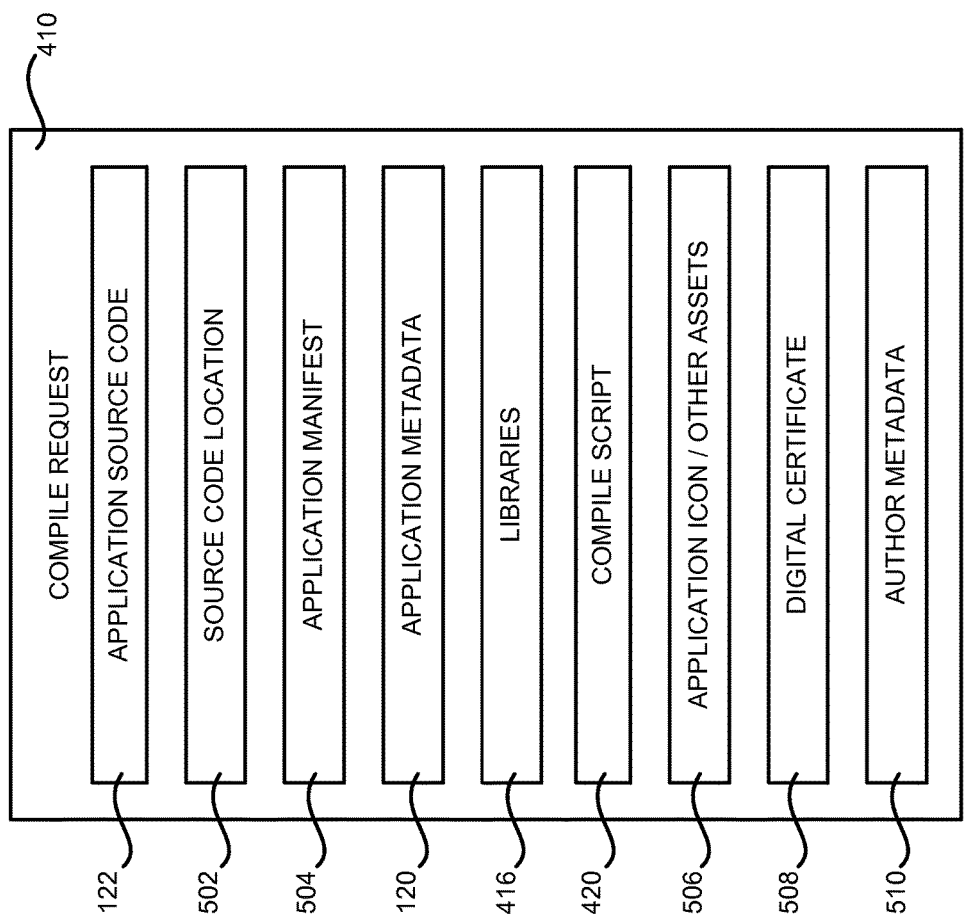
FIG. 5 is a data structure diagram illustrating aspects of a compile request utilized by the cross-platform compilation service shown in FIG. 4 in some configurations disclosed herein.

FIG. 5 is a data structure diagram illustrating aspects of a compile request 410 utilized by the cross-platform compilation service 106 shown in FIG. 4 in some configurations disclosed herein. As shown in FIG. 5, the compile request 410 may include the source code 122, or a reference 502 to the location of the source code 122, that is to be compiled into a platform specific application binary 108. The compile request 410 might also include an application manifest 504 for use in compiling the source code 122. The manifest 504 might specify one or more plug-ins to be utilized during compilation and whether the source code 122 requires the use of cross-platform services and/or device or platform specific functionality. The manifest 504 might also include other data in other configurations.

The compile request 410 might also include or reference any libraries 416 that are required to build the source code 122. As discussed above, the compile request 410 might also include or reference a compile script 420 for managing the compilation of the source code 122. The compile request 410 might also include or reference an application icon and/or other assets 506 needed to compile the source code 122. The assets may be stored in a location in the service provider network 102 provided by a storage service in some configurations.

The compile request 120 might also include application metadata 120, such as the name of the application, received from the developer 110 or generated in the manner described above. The compile request 120 might also include author metadata 510 providing information about the author of the source code 122 (i.e. the developer 110).

In some configurations, the compile request 410 also includes one or more digital certificates 508. The digital certificates 508 may be utilized to cryptographically sign the application binaries 108 prior to submission to application stores 128 in some configurations. A password associated with the digital certificate 508 might also be provided. In this regard, it should be appreciated that the developer 110 might be permitted to specify whether the application binaries 108 are to be created for testing or for "production." A production binary 108 is a binary that is available for consumption by a user, such as through an application store 108. Depending on the selection the developer 110 makes, the application binaries 108 might be generated in different ways. For example, if "production" binaries 108 are to be generated, the digital certificate 508 might be utilized to sign the binaries 108. In a test environment, the binaries 108 might be unsigned or signed with a different digital certificate.

It should be appreciated that the structure of the compile request 410 shown in FIG. 4 is merely illustrative and that other configurations might be utilized. For example, the compile request 410 might include less or more information than shown in FIG. 5 in other configurations.

Figure 6:
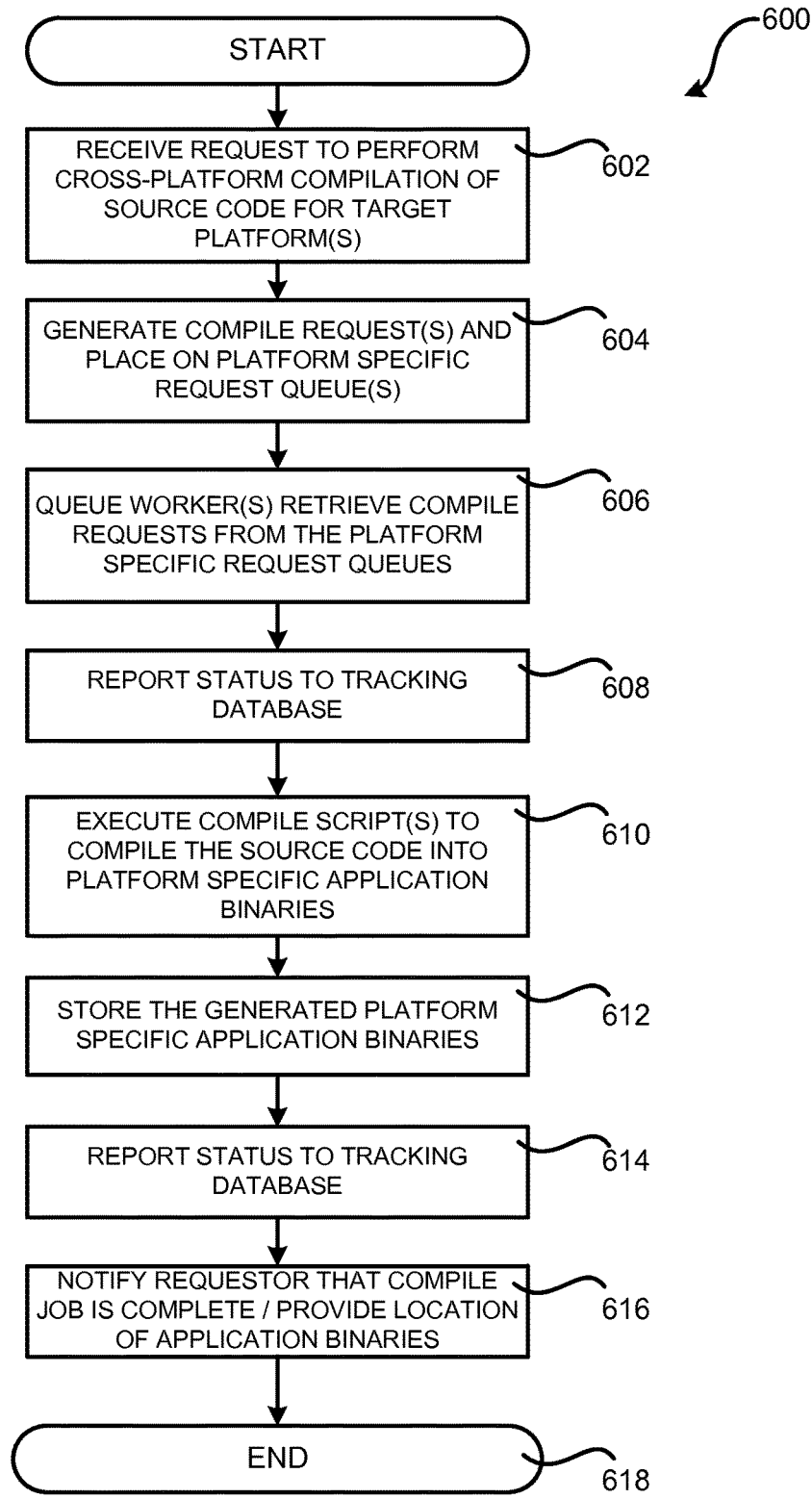
FIG. 6 is a flow diagram illustrating aspects of a routine disclosed herein for providing a cross-platform compilation service.

FIG. 6 is a flow diagram illustrating aspects of a routine 600 disclosed herein for providing the cross-platform compilation service 106. The routine 600 begins at operation 602, where the compile service 402 receives a request to perform cross-platform compilation of source code 122 for the target platforms 118. In response to such a request, the routine 600 proceeds from operation 602 to operation 604, where the compile service 402 generates compile requests 410 for the target platforms 118 and places the compile requests 410 on platform specific request queues 408 corresponding to the target platforms 118.

From operation 604, the routine 600 proceeds to operation 606, where the queue workers 418 executing on the compile systems 412 retrieve the compile requests 410 from the platform specific request queues 408. In one configuration, the queue workers 418 also create an entry in the tracking database 424 at operation 608 indicating that a compile request 410 has been dequeued. Other types of entries might also be made in the tracking database 424 at other times during the operation of the queue workers 418.

From operation 608, the routine 600 proceeds to operation 610, where the compile scripts 420 contained in the compile requests 410 are executed. As discussed above, the compile scripts 420 cause the source code 122 contained in or referenced by a compile request 410 to be compiled into a platform specific application binary 108. The generated platform specific application binaries 108 are then stored in the storage location 124 in one configuration. A status update may then be made to the tracking database 424 at operation 614 indicating that compilation has been completed. Alternatively, or additionally, an entry may be created in the completion queue 426 indicating that the compile job has been completed.

From operation 614, the routine 600 proceeds to operation 616, where the compile service 402 notifies the requestor that the compile job has completed. Additionally, and as discussed above, the compile service 402 may provide the location of the generated application binaries 108 to the requestor. The routine 600 then proceeds from operation 616 to operation 618, where it ends.

It should be appreciated that various other types of functionality might be enabled through an implementation of the technologies described above. For example, and without limitation, a developer 110 may be provided with a unified account for monetization of services. In particular, using the mechanism described above platform specific application binaries 108 might be created that reference a single account for monetization. In this way, rather than receiving payment separately from each of the application stores 128, the developer 110 might receive a single payment from the operator of the application builder service 104. As other examples, cross-platform reporting and marketing might also be enabled using the mechanisms described above. Other types of functionality might also be enabled through an implementation of the technologies presented herein.

Figure 7:
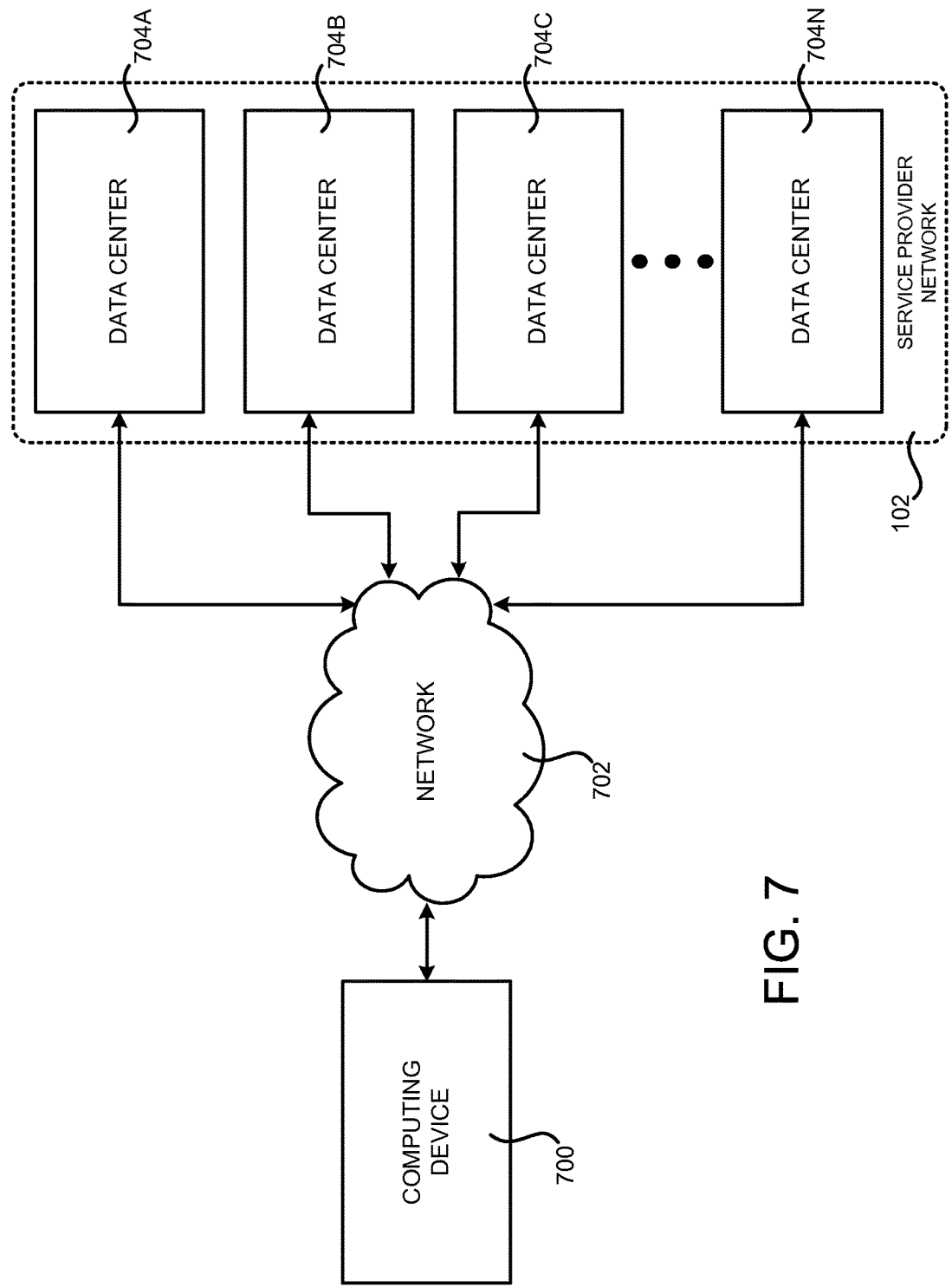
FIG. 7 is a system and network diagram that shows an illustrative operating environment that includes a service provider network that may be configured to implement aspects of the functionality described herein.

FIG. 7 is a system and network diagram that shows one illustrative operating environment for the configurations disclosed herein that includes a service provider network 102 that may be configured to generate and publish application binaries 108 in the manner described above, according to one configuration disclosed herein. As discussed above, the service provider network 102 can provide computing resources on a permanent or an as-needed basis. Among other types of functionality, the computing resources provided by the service provider network 102 can be utilized to execute the various services and other software components described above. The computing resources provided by the service provider network 102 may include various types of computing resources, such as data processing resources, data storage resources, networking resources, data communication resources, network services, and the like.

Each type of computing resource provided by the service provider network 102 may be general-purpose or may be available in a number of specific configurations. For example, data processing resources may be available as physical computers or virtual machine instances in a number of different configurations. The virtual machine instances may be configured to execute applications, including web servers, application servers, media servers, database servers, some or all of the services described above, and/or other types of programs. Data storage resources may include file storage devices, block storage devices, and the like. The service provider network 102 might also be configured to provide other types of resources and network services.

The computing resources provided by the service provider network 102 are enabled in one implementation by one or more data centers 704A-704N (which may be referred herein singularly as "a data center 704" or in the plural as "the data centers 704"). The data centers 704 are facilities utilized to house and operate computer systems and associated components. The data centers 704 typically include redundant and backup power, communications, cooling, and security systems. The data centers 704 might also be located in geographically disparate locations. One illustrative configuration for a data center 704 that implements some of the technologies disclosed herein for generating and publishing application binaries 108 from a website will be described below with regard to FIG. 8.

The customers and other users of the service provider network 102 may access the computing resources provided by the service provider network 102 over a network 702, which may be a wide area communication network ("WAN"), such as the Internet, an intranet or an Internet service provider ("ISP") network or a combination of such networks. For example, and without limitation, a computing device 700 operated by a customer or other user of the service provider network 102, such as the developer 110, might be utilized to access the service provider network 102 by way of the network 702. It should be appreciated that a local-area network ("LAN"), the Internet, or any other networking topology known in the art that connects the data centers 704 to remote customers and other users may be utilized. It should also be appreciated that combinations of such networks might also be utilized.

Figure 8:
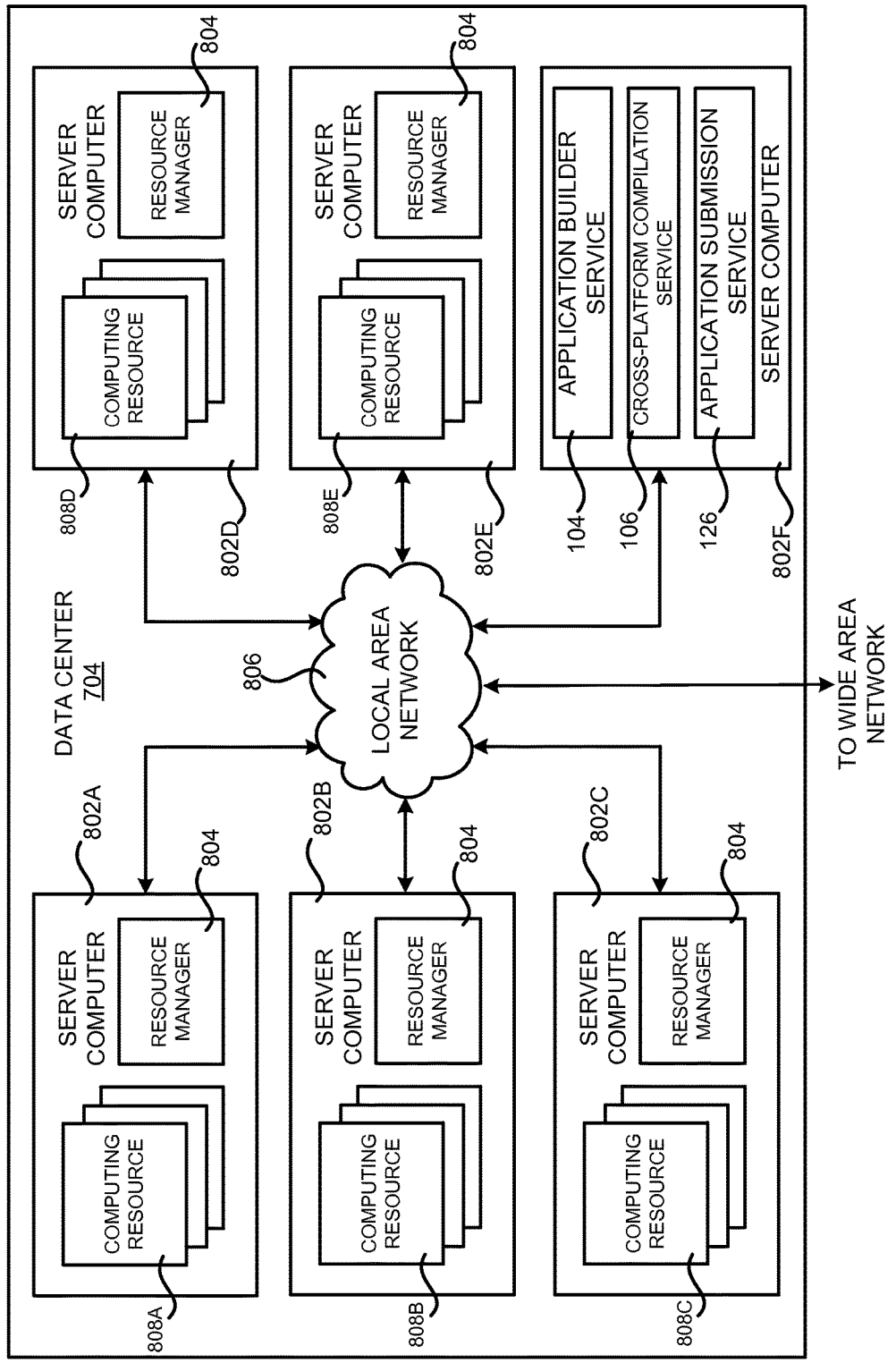
FIG. 8 is a computing system diagram that illustrates a configuration for a data center that may be utilized to implement aspects of the technologies disclosed herein.

FIG. 8 is a computing system diagram that illustrates one configuration for a data center 704 that implements aspects of the concepts and technologies disclosed herein for generating application binaries 108 for multiple platforms from a website. The example data center 704 shown in FIG. 8 includes several server computers 802A-802F (which may be referred to herein singularly as "a server computer 802" or in the plural as "the server computers 802") for providing computing resources 808A-808E.

The server computers 802 may be standard tower, rack-mount, or blade server computers configured appropriately for providing the computing resources described herein. As mentioned above, the computing resources might be data processing resources such as virtual machine instances or hardware computing systems, data storage resources, database resources, networking resources, and others. Some of the servers 802 might also be configured to execute a resource manager 804 capable of instantiating and/or managing the computing resources. In the case of virtual machine instances, for example, the resource manager 804 might be a hypervisor or another type of program configured to enable the execution of multiple virtual machine instances on a single server 802. Server computers 802 in the data center 504 might also be configured to provide network services and other types of services, some of which are described in detail below with regard to FIG. 9.

The data center 704 shown in FIG. 7 also includes a server computer 802F that may execute some or all of the software components described above. For example, and without limitation, the server computer 802F might be configured to execute one or more of the application builder service 104, the cross-platform compilation service 106, and/or the application submission service 126, each of which has been described in detail above. The server computer 802F might also be configured to execute other components and/or to store data for providing some or all of the functionality described herein. In this regard, it should be appreciated that the network services illustrated in FIG. 8 as executing on the server computer 802F might execute on many other physical or virtual servers in the data centers 704 in various configurations.

In the example data center 704 shown in FIG. 8, an appropriate LAN 806 is also utilized to interconnect the server computers 802A-802F. The LAN 806 is also connected to the network 702 illustrated in FIG. 7. It should be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components might also be utilized for balancing a load between each of the data centers 704A-704N, between each of the server computers 802A-802F in each data center 704, and, potentially, between computing resources in each of the data centers 704. It should be appreciated that the configuration of the data center 704 described with reference to FIG. 8 is merely illustrative and that other implementations might be utilized.

Figure 9:
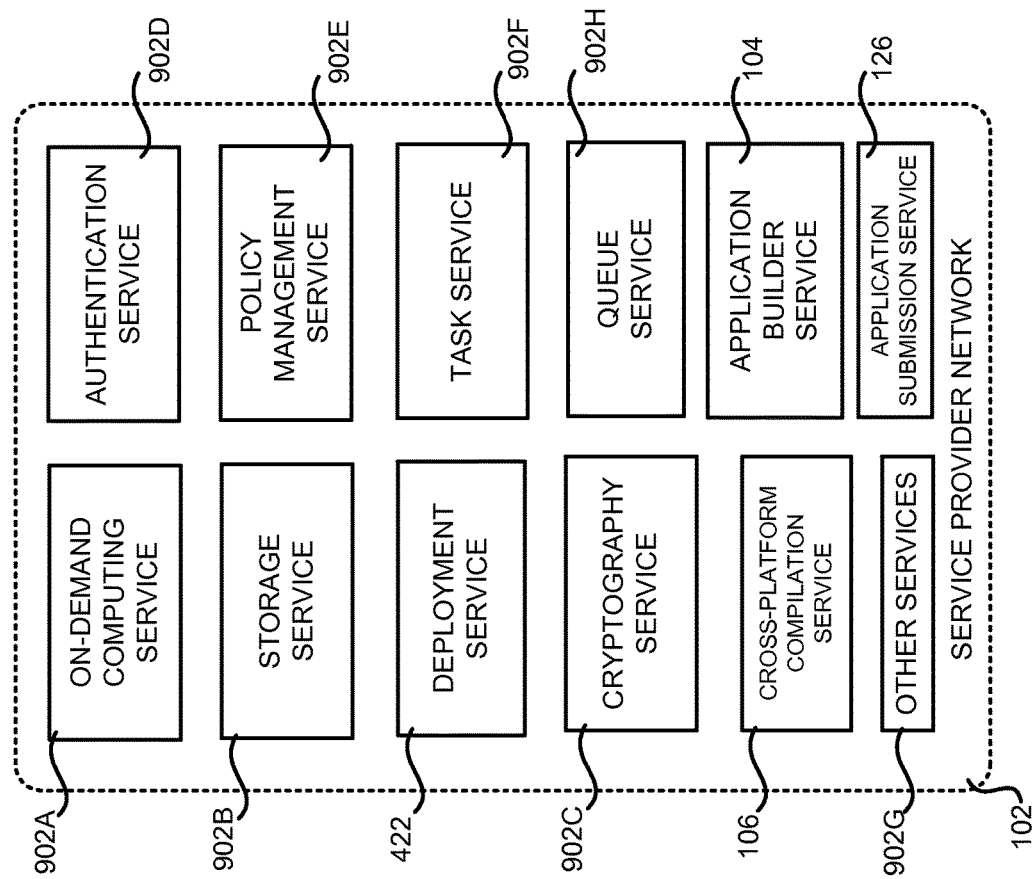
FIG. 9 is a system and network diagram that shows aspects of several services that might be provided by and utilized within a service provider network in one configuration disclosed herein.

FIG. 9 is a system and network diagram that shows aspects of several network services that might be implemented within the service provider network 102 and utilized to implement aspects of the functionality disclosed herein in various configurations. In particular, and as discussed briefly above, the service provider network 102 may provide a variety of network services to customers and other users of the service provider network 102 including, but not limited to, an on-demand computing service 902A, a storage service 902B, a cryptography service 902C, an authentication service 902D, a policy management service 902E, and/or a task service 902F, each of which is described in greater detail below. Additionally, the service provider network 102 might also provide the deployment service 422, the cross-platform compilation service 106, the application builder service 104, and/or the application submission service 126, each of which was described in detail above. The service provider network 102 might also provide other services 902G, some of which are described below.

It is noted that not all configurations described include the services described with reference to FIG. 9 and that additional services may be provided in addition to or as an alternative to services explicitly described. Each of the services shown in FIG. 9 might also expose web service interfaces that enable a caller to submit appropriately configured API calls to the various services through web service requests. In addition, each of the illustrated services may include service interfaces that enable the services to access each other (e.g., to enable a virtual computer system provided by the on-demand computing service 902A to store data in or retrieve data from the data storage service 902B). Additional details regarding some of the services shown in FIG. 9 will now be provided.

The on-demand computing service 902A may be a collection of computing resources configured to instantiate virtual machine instances. For example, a customer or other user of the service provider network 902A may interact with the on-demand computing service 902A (via appropriately configured and authenticated API calls) to provision and operate virtual computer systems that are instantiated on physical computing devices hosted and operated by the service provider network 102.

The virtual computer systems provided by the on-demand computing service 902A may be used for various purposes, such as to implement the compile systems 412, to implement other services described herein, to operate as servers supporting a website, to operate business applications or, generally, to serve as computing resources for the customer. Other applications for the virtual computer systems may be to support database applications, electronic commerce applications, business applications and/or other applications. Although the on-demand computing service 902A is shown in FIG. 9, any other computer system or computer system service may be utilized in the service provider network 102 to implement the functionality disclosed herein, such as a computer system or computer system service that does not employ virtualization and instead provisions computing resources on dedicated or shared computers/servers and/or other physical devices.

The storage service 902B might include software and computing resources that collectively operate to store data using block or file-level storage devices (and/or virtualizations thereof). The storage devices of the storage service 902B might, for instance, be operationally attached to virtual computer systems provided by the on-demand computing service 902A to serve as logical units (e.g., virtual drives) for the computer systems. A storage device might also enable the persistent storage of data used/generated by a corresponding virtual computer system where the virtual computer system service might only provide ephemeral data storage. As discussed above, the storage service 902B might be utilized to provide a storage location 124 for the platform specific application binaries 108, for storing a website, for storing website assets such as images and/or videos, and/or for storing other types of programs and data.

The service provider network 102 may also include a cryptography service 902C. The cryptography service 902C may utilize storage services of the service provider network 102, such as the storage service 902B, to store encryption keys in encrypted form, whereby the keys may be usable to decrypt customer keys accessible only to particular devices of the cryptography service 902C. The cryptography service 902C might also provide other types of functionality not specifically mentioned herein.

As illustrated in FIG. 9, the service provider network 102, in various configurations, also includes an authentication service 902D and a policy management service 902E. The authentication service 902D, in one example, is a computer system (i.e., collection of computing resources) configured to perform operations involved in authentication of users. For instance, one of the services 902 shown in FIG. 9 may provide information from a user to the authentication service 902D to receive information in return that indicates whether or not the requests submitted by the user are authentic.

The policy management service 902E, in one example, is a network service configured to manage policies on behalf of customers or internal users of the service provider network 102. The policy management service 902E may include an interface that enables customers to submit requests related to the management of policy. Such requests may, for instance, be requests to add, delete, change or otherwise modify policy for a customer, service, or system, or for other administrative actions, such as providing an inventory of existing policies and the like.

The service provider network 102, in various configurations, is also configured with a task service 902F. The task service 902F is configured to receive a task package and to enable executing tasks as dictated by the task package. The task service 902F may be configured to use any resource of the service provider network 102, such as instantiated virtual machines or virtual hosts, for executing the task. The task service 902F may configure the instantiated virtual machines or virtual hosts to operate using a selected operating system and/or a selected execution application in accordance with specified requirements.

The service provider network 102 might also maintain a queue service 902H. The queue service 902H provides functionality for allowing users to define one or more queues, such as the platform specific request queues 408 and/or the completion queue 426. The queue service 902H might also provide other types of functionality not specifically mentioned herein.

The service provider network 102 may additionally maintain other services 902 based, at least in part, on the needs of its customers. For instance, the service provider network 102 may maintain the deployment service 422 for deploying program code and/or a database service for providing the tracking database 424 (not shown in FIG. 9) in some configurations. A database service may be a collection of computing resources that collectively operate to create, maintain, and allow queries to be performed on databases stored within the service provider network 102. For example, a customer or other user of the service provider network 102 may operate and manage a database, such as the tracking database 424, from the database service by utilizing appropriately configured network API calls. This, in turn, may allow the customer to maintain and potentially scale the operations in the database. Other services include object-level archival data storage services, and services that manage, monitor, interact with, or support other services. The service provider network 102 might also be configured with other services not specifically mentioned herein in other configurations.

Figure 10:
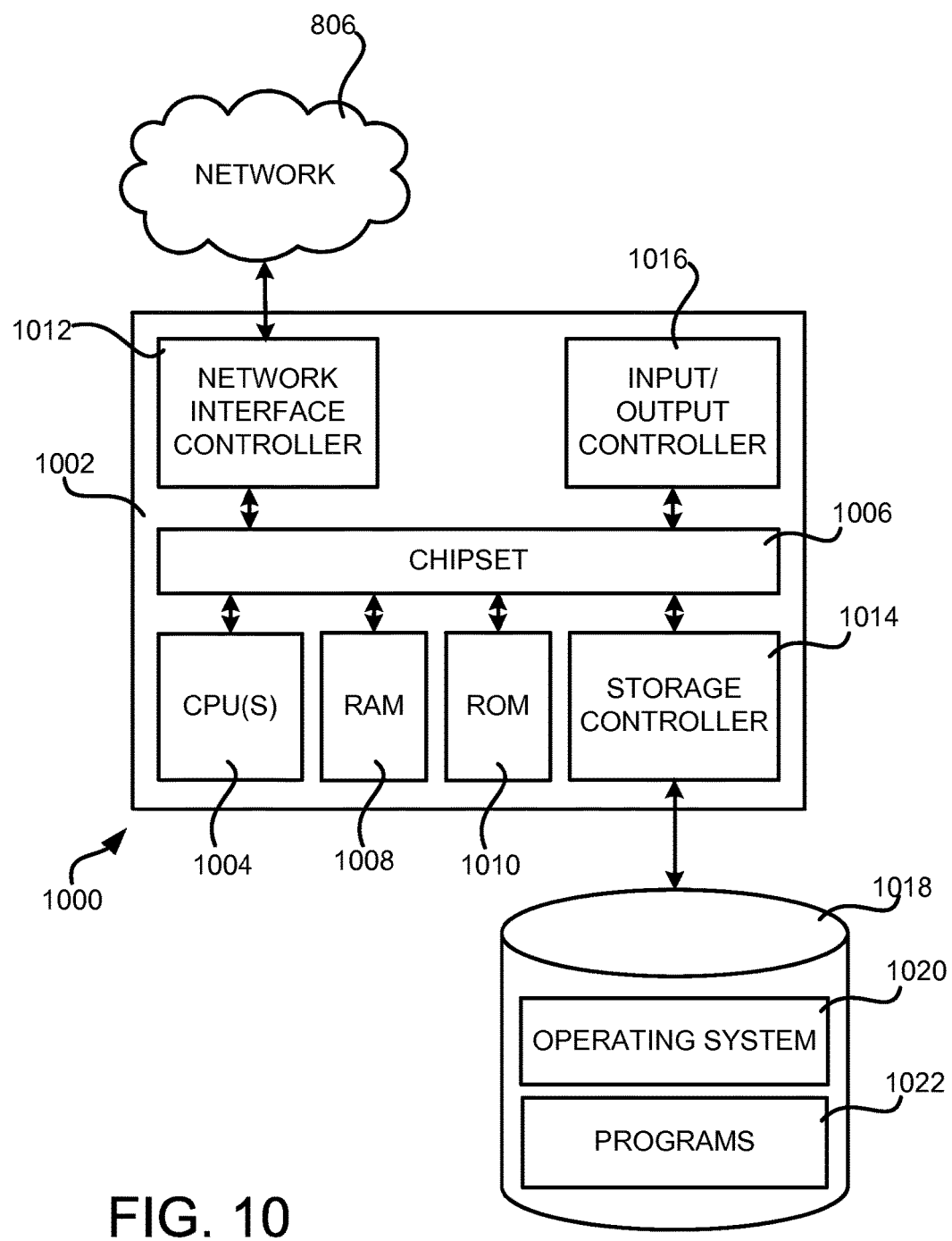
FIG. 10 is a computer architecture diagram showing an illustrative computer hardware architecture for implementing a computing device that might be utilized to implement aspects of the various technologies presented herein.

FIG. 10 shows an example computer architecture for a computer 1000 capable of executing program components for implementing various aspects of the functionality described above. The computer architecture shown in FIG. 10 illustrates a conventional server computer, workstation, desktop computer, laptop, tablet, network appliance, e-reader, smartphone, or other computing device, and may be utilized to execute any of the software components presented herein.

The computer 1000 includes a baseboard 1002, or "motherboard," which is a printed circuit board to which a multitude of components or devices may be connected by way of a system bus or other electrical communication paths. In one illustrative configuration, one or more central processing units ("CPUs") 1004 operate in conjunction with a chipset 1006. The CPUs 1004 may be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 may provide an interface to a RAM 1008, used as the main memory in the computer 1000. The chipset 1006 may further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM may also store other software components necessary for the operation of the computer 1000 in accordance with the configurations described herein.

The computer 1000 may operate in a networked environment using logical connections to remote computing devices and computer systems through a network, such as the network 806. The chipset 1006 may include functionality for providing network connectivity through a NIC 1012, such as a gigabit Ethernet adapter. The NIC 1012 is capable of connecting the computer 1000 to other computing devices over the network 606. It should be appreciated that multiple NICs 1012 may be present in the computer 1000, connecting the computer to other types of networks and remote computer systems.

The computer 1000 may be connected to a mass storage device 1018 that provides non-volatile storage for the computer. The mass storage device 1018 may store an operating system 1020, programs 1022, and data, which have been described in greater detail herein. The mass storage device 1018 may be connected to the computer 1000 through a storage controller 1014 connected to the chipset 1006. The mass storage device 1018 may consist of one or more physical storage units. The storage controller 1014 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 may store data on the mass storage device 1018 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1018 is characterized as primary or secondary storage, and the like.

For example, the computer 1000 may store information to the mass storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 may further read information from the mass storage device 1018 by detecting the physical states or characteristics of one or more particular locations within the physical storage units.

In addition to the mass storage device 1018 described above, the computer 1000 may have access to other computer-readable storage media to store and retrieve information, such as program modules, data structures, or other data.

It should be appreciated by those skilled in the art that computer-readable storage media is any available media that provides for the non-transitory storage of data and that may be accessed by the computer 1000.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1018 may store an operating system 1020 utilized to control the operation of the computer 1000. According to one configuration, the operating system comprises the LINUX operating system. According to another configuration, the operating system comprises the WINDOWS® SERVER operating system from MICROSOFT Corporation. According to further configurations, the operating system may comprise the UNIX operating system or one of its variants. It should be appreciated that other operating systems may also be utilized. The mass storage device 1018 may store other system or application programs and data utilized by the computer 1000.

In one configuration, the mass storage device 1018 or other computer-readable storage media is encoded with computer-executable instructions which, when loaded into the computer 1000, transform the computer from a general-purpose computing system into a special-purpose computer capable of implementing the configurations described herein. These computer-executable instructions transform the computer 1000 by specifying how the CPUs 1004 transition between states, as described above. According to one configuration, the computer 1000 has access to computer-readable storage media storing computer-executable instructions which, when executed by the computer 1000, perform the various processes described above with regard to FIGS. 1-6. The computer 1000 might also include computer-readable storage media for performing any of the other computer-implemented operations described herein.

The computer 1000 may also include one or more input/output controllers 1016 for receiving and processing input from a number of input devices, such as a keyboard, a mouse, a touchpad, a touch screen, an electronic stylus, or other type of input device. Similarly, an input/output controller 1016 may provide output to a display, such as a computer monitor, a flat-panel display, a digital projector, a printer, a plotter, or other type of output device. It will be appreciated that the computer 1000 may not include all of the components shown in FIG. 10, may include other components that are not explicitly shown in FIG. 10, or may utilize an architecture completely different than that shown in FIG. 10.

Based on the foregoing, it should be appreciated that technologies for generating and publishing applications for multiple platforms based upon a website have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example configurations and applications illustrated and described, and without departing from the true spirit and scope of the present invention, which is set forth in the following claims.

What is claimed is:

1. A system comprising:
one or more processors; and
at least one non-transitory computer-readable storage medium having instructions stored thereupon which are executable by the one or more processors and which, when executed, cause the system to:
receive first website data,
receive an indication of a target platform;
generate, from the first web site data, second web site data for presentation on computing devices configured according to the target platform,
determine a first web view component configured to fetch and render the second website data in the target platform;
compile the second website data to create platform specific application binary for the target platform, the platform specific application binary configured to render the second website data when executed on devices configured according to the target platform, the platform specific application binary for the target platform including the first web view component; and
send the platform specific application binary to application stores associated with the first target platform.

2. The system of claim 1, wherein the second website data is generated by one or more of modifying one or more page layouts of the first website data, modifying one or more menu styles of the first website data, or modifying a resolution of one or more images of the first web site data.

3. The system of claim 1, wherein the non-transitory computer-readable storage medium has further instructions stored thereupon to generate metadata for the platform specific application binary from the first website data.

4. The system of claim 1, wherein the platform specific application binary is configured to access one or more cross platform services.

5. The system of claim 1, wherein the platform specific application binary is configured to utilize one or more platform specific features of devices configured according to the target platform.

6. The system of claim 1, wherein the compiling is performed by a cross-platform compilation service executing in a service provider network.

7. At least one non-transitory computer-readable storage medium having computer-executable instructions stored thereupon which, when executed by a computer, cause the computer to:
generate first website data, for presentation on devices configured according to a target platform, based at least in part on second website data;
determine a web view component configured to fetch and render the first website data in the target platform; and
compile the first website data to create platform specific application binary for the target platform, the platform specific application binary for the target platform including the web view component.

8. The at least one non-transitory computer-readable storage medium of claim 7, wherein generating the first website data comprises one or more of:
modifying one or more page layouts of the second website data;
modifying one or more styles of the second website data; or
modifying a resolution of one or more images of the second web site data.

9. The at least one non-transitory computer-readable storage medium of claim 7, having further computer-executable instructions stored thereupon to publish the platform specific application binary on application stores associated with the target platform.

10. The at least one non-transitory computer-readable storage medium of claim 7, having further computer-executable instructions stored thereupon to generate metadata for the platform specific application binary from the first website data.

11. The at least one non-transitory computer-readable storage medium of claim 7, wherein the platform specific application binary is configured to access one or more cross platform services.

12. The at least one non-transitory computer-readable storage medium of claim 11, wherein the cross platform services comprise one or more of an in-application purchasing service, an analytics service, an advertising service, or a testing service.

13. The at least one non-transitory computer-readable storage medium of claim 7, wherein the platform specific application binary is configured to utilize one or more platform specific features of the devices configured according to the target platform.

14. A computer-implemented method comprising:
generating, from first website data, first modified website data for presentation on devices configured according to a first target platform;
generating, from the first web site data, second modified web site data for presentation on devices configured according to a second target platform;
determining a first web view component configured to fetch and render the first modified website data in the first target platform;
determining a second web view component configured to fetch and render the second modified website data in the second target platform;
compiling the first modified web site data to create first platform specific application binary for the first target platform; and
compiling the second modified web site data to create second platform specific application binary for the second target platform, the first platform specific application binary configured to render the first modified website data when executed on the devices configured according to the first target platform, the second platform specific application binary configured to render the second modified website data when executed on the devices configured according to the second target platform, the first platform specific application binary including the first web view component, and the second platform specific application binary including the second web view component.

15. The computer-implemented method of claim 14, further comprising publishing the first and second platform specific application binaries on application stores associated with the plurality of target platforms.

16. The computer-implemented method of claim 14, wherein generating the first modified website data comprises one or more of:
   modifying one or more page layouts of the first web site data;
   modifying one or more styles of the first website data; or
   modifying a resolution of one or more images of the first web site data.

17. The computer-implemented method of claim 14, further comprising generating metadata for the first and second platform specific application binaries respectively from the first and second modified website data.

18. The computer-implemented method of claim 14, wherein the first and second platform specific application binaries are configured to access one or more cross platform services.

19. The computer-implemented method of claim 18, wherein the cross platform services comprise one or more of an in-application purchasing service, an analytics service, an advertising service, or a testing service.

20. The computer-implemented method of claim 14, wherein the first and second platform specific application binaries are configured to utilize one or more platform specific features of the devices configured according to the target platforms.

* * * * *